United States Patent [19]

Takahashi et al.

[11] Patent Number: 5,408,016
[45] Date of Patent: Apr. 18, 1995

[54] PROCESS FOR PRODUCING ETHYLENE POLYMERS

[75] Inventors: Tadashi Takahashi; Yoichi Maeda; Naoko Kusaka, all of Yokkaichi, Japan

[73] Assignee: Mitsubishi Petrochemical Company Limited, Tokyo, Japan

[21] Appl. No.: 49,300

[22] Filed: Apr. 21, 1993

[30] Foreign Application Priority Data

Apr. 21, 1992 [JP] Japan .................................. 4-101391

[51] Int. Cl.$^6$ ..................... C08F 4/654; C08F 10/02
[52] U.S. Cl. ................................... 526/125; 502/134; 526/348.5; 526/352
[58] Field of Search .......................................... 526/125

[56] References Cited

U.S. PATENT DOCUMENTS 4,931,517  6/1990  Fujita .
5,026,797  7/1991  Takahashi .
5,122,584  6/1992  Takahashi .
5,214,114  5/1993  Takahashi et al. .

FOREIGN PATENT DOCUMENTS 0330255  8/1989  European Pat. Off. .

*Primary Examiner*—Edward J. Smith
*Attorney, Agent, or Firm*—Oblon, Spivak, McClelland, Maier & Neustadt

[57] ABSTRACT

A process for producing an ethylene polymer comprising bringing ethylene or ethylene and an α-olefin having 3 to 10 carbon atoms into contact with a catalyst comprising the following components (A) and (B):

component (A): a solid component for a Ziegler type catalyst obtained by bringing a solid product obtained by sequentially contacting the following components (A-1), (A-2) and (A-3) and then washing the contact product formed into contact with the component (A-4):

component (A-1): a solid catalyst component comprising the following components (i), (ii) and (iii) wherein component (i) is a magnesium dihalide; component (ii) is a titanium tetraalkoxide and/or a polytitanic acid ester;

and component (iii) is a polymeric Si compound represented by the formula:

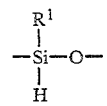

($R^1$: a hydrocarbyl group)

component (A-2) which is an organoaluminum compound; component (A-3) which is a silicon halide; and component (A-4) which is an organoaluminum halide; and component (B) which is an organoaluminum compound.

An ethylene polymer in a high activity and having a molecular weight distribution of a middle width can be produced stably on an industrial scale. Such an ethylene polymer is useful particularly as a resin for producing fibers and tapes.

18 Claims, No Drawings

PROCESS FOR PRODUCING ETHYLENE POLYMERS

BACKGROUND OF THE INVENTION

1. Field of the Invention

The present invention relates to a process for producing an ethylene polymer having a molecular weight distribution of a middle width.

2. Description of the Related Art

Ethylene polymers are used for different purposes depending on their molecular weight distribution. More specifically, polymers having a wide molecular weight distribution are often used for blow moldings; polymers having a middle molecular weight distribution are often used for fibers, tapes and the like; and polymers having a narrow molecular weight distribution are often used for injection moldings such as bottle caps, buckets and the like.

Hitherto, solid catalyst components comprising a magnesium halide and a titanium halide known as catalysts having high activities generally produce ethylene polymers having a narrow molecular weight distribution. For this reason these catalyst components are suitable for the production of polyolefins for injection moldings such as bottle caps and buckets but are generally unsuitable for the production of the other articles as described above.

Recently, there has been a need for development of a catalyst which will produce polymers having a wide molecular weight distribution for the purpose of extending the applications of the polymers, and many methods in which a variety of transition metal compounds are used or a catalyst component is supported on an inorganic oxide carrier have been invented (e.g., Japanese Patent Publication Nos. 37037/1977, 8588/1978, 006/1980, 45247/1982, 13084/1983 and 58364/1987, etc.).

We have previously proposed a process for preparing a solid catalyst component which has excellent particle form and is particularly suitable for slurry polymerization or vapor phase polymerization by treating a composition corresponding to the component (A-1) of the present invention (described hereinafter in detail) with (1) a silicon halide, (2) a titanium halide, (3) a titanium halide and a hydropolysiloxane, or the like (see, for example, Japanese Patent Laid-Open Publication Nos. 127706/1983, 285203/1986, 285204/1986, 285205/1986, 180612/1982, 5309/1983 and 5311/1983). These catalysts, which may be or may have been useful in their own ways, may further be improved if the molecular weight distribution of the polymer obtained is broaden or if their catalyst activities are increased.

We have proposed catalysts prepared by treating a composition corresponding to the component (A-1) with (1) an aluminum halide, (2) an aluminum halide and a titanium or silicon halide, (3) an organoaluminum compound or a hydropolysiloxane and an aluminum halide, or the like (see, for example, Japanese Patent Laid-Open Publication Nos. 12903/1984 and 43007/1984). However, these catalysts, which have a comparatively high activity and provide polymers having a wide molecular weight distribution, may require further improvement in that mass formation of solid particles during the reaction of the aluminum halide thus causing variation of the catalyst activity or nonuniform formation of the particles will be reduced.

Furthermore, there have been proposed catalysts prepared by treating a composition corresponding to the component (A-1) with an organoaluminum compound and a titanium or silicon halide (e.g., Japanese Patent LaidOpen Publication No. 225104/1983). However, these catalysts often had activities and widths of their molecular weight distribution at unsatisfactory levels, and thus improvements have been desired.

In addition, a catalyst prepared by reacting a reaction product of a magnesium dihalide, a halogenated Si compound and a Ti compound with an alkylaluminum halide has been proposed in Japanese Patent Laid-Open Publication No. 212209/1982. An ethylene polymer produced with this catalyst, as far as we know, had a narrow molecular weight distribution. Thus it was difficult to obtain such a product as an object of the present invention.

An object of the present invention is to provide an ethylene polymer having a molecular weight distribution of a middle width by using a catalyst having a high activity and is intended to be accomplished by the use of a specific catalyst.

SUMMARY OF THE INVENTION

The process for producing an ethylene polymer according to the present invention comprises contacting an α-olefin which is ethylene or ethylene and an α-olefin having 3 to 10 carbon atoms with a catalyst thereby to polymerize the α-olefin, the catalyst comprising the following components (A) and (B):

component (A) which is a solid component for a Ziegler catalyst obtained by bringing the following component (A-4) into contact with a solid product obtained by sequentially contacting the following components (A-1), (A-2) and (A-3) and then washing the contact product obtained:

component (A-1) which is a solid catalyst component comprising the following components (A-1-i), (A-1-ii) and (A-1-iii):

component (A-1-i) which is a magnesium dihalide;

component (A-1-ii) which is a titanium tetraalkoxide and/or a polytitanic acid ester;

component (A-1-iii) which is a polymeric silicon compound represented by the formula:

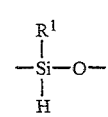

wherein $R^1$ represents a hydrocarbyl group;

component (A-2) which is an organoaluminum compound;

component (A-3) which is a silicon halide;

component (A-4) which is an organoaluminum halide; and component (B) which is an organoaluminum compound.

According to the present invention, an ethylene polymer having a molecular weight distribution of a middle width by using a catalyst having a high activity can be produced stably on an industrial scale. Such an ethylene polymer is useful particularly as a resin for producing fibers and tapes.

DETAILED DESCRIPTION OF THE INVENTION

Catalyst

The catalyst used in the present invention comprises the following components (A) and (B). The term "comprises" herein does not mean that the components are only the aforementioned components (i.e., (A) and (B)) but does not exclude the coexistence of another appropriate component.

Component (A)

The component (A) is a solid component for a Ziegler catalyst obtained by bringing (i) a solid product obtained by sequentially contacting the following components (A-1), (A-2) and (A-3) and then washing the contact product obtained into contact with (ii) the component (A-4). The phraseology "obtained by bringing . . . into contact" herein includes, in addition to a contact product of only the aforementioned components, a product prepared by the contact with another appropriate component.

Component (A-1)

1) Constituents

The component (A-1) is a solid catalyst component comprising the following components (A-1-i), (A-1-ii) and (A-1-iii). The term "comprises" herein does not mean that the components are only the aforementioned components (i.e., (A-1-i), (A-1-ii) and (A-1-iii)) but does not exclude the coexistence of another appropriate component. In this connection, it is needless to say that the term "comprises" does not always mean that the aforementioned compounds are existing in their "as is" form.

The solid catalyst component (A-1) is not a magnesium dihalide nor a complex of a magnesium dihalide and a titanium tetraalkoxide or a polytitanic acid ester but is a solid different from these compounds. The matter of the component has not been sufficiently analyzed at present but the composition analysis tells that the solid composition contains titanium, magnesium, a halogen and silicon. The specific surface area of the solid catalyst component (A-1) is small in most cases and is generally 10 m²/g or less. As a result of X-ray diffraction, no peak characteristic for the magnesium dihalide is observed in the solid component (A), which seems different from the magnesium dihalide from the standpoint of X-ray diffractometry. The solid catalyst component (A-1), when used for vapor phase polymerization, has preferably an average particle diameter in the range of from 22 to 35 μm.

(1) Component (A-1-i).

This component is a magnesium dihalide and specifically includes for example $MgF_2$, $MgCl_2$, and $MgBr_2$. $MgCl_2$ is most preferable.

(2) Component (A-1-ii)

This component is a titanium tetraalkoxide and/or a polytitanic acid ester.

Examples of the titanium tetraalkoxide are those where the alkyl in the alkoxy group has 1 to 12, preferably 1 to 6, more preferably around 4, carbon atoms and include $Ti(OC_2H_5)_4$, $Ti(O-iC_3H_7)_4$, $Ti(O-nC_3H_7)_4$, $Ti(O-nC_4H_9)_4$, $Ti(O-iC_4H_9)_4$, $Ti(O-tC_4H_9)_4$, $Ti(O-C_5H_{11})_4$, $Ti(O-C_6H_{13})_4$, $Ti(O-C_7H_{15})_4$, $Ti(O-C_8H_{17})_4$, and $Ti(O-C_{10}H_{21})_4$.

Examples of the polytitanic acid ester include those represented by the general formula:

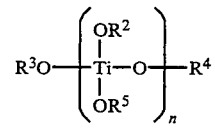

wherein $R^2$ to $R^5$, respectively, independently represent a hydrocarbyl group, preferably saturated, having preferably 1 to 20 carbon atoms, more preferably 1 to 6 carbon atoms, still more preferably around 4 carbon atoms, n denotes a number of 2 or more, particularly 2 to 10. Specifically, they include tetra-n-butyl polytitanate (polymerization degree n=2 to 10), tetra-n-hexyl polytitanate (polymerization degree n=2 to 10), and tetra-octyl polytitanate (polymerization degree n=2 to 10).

(3) Compound (A-1-iii).

This component is a polymeric silicon compound which has a recurring unit represented by the formula:

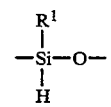

wherein $R^1$ represents a hydrocarbyl group having preferably 1 to about 10 carbon atoms, more preferably 1 to about 6 carbon atoms, preferably an alkyl group, a phenyl group and an alkyl-substituted phenyl group. Thus, specific examples of the polymeric Si compound having the above-described recurring unit are methylhydrogenpolysiloxane, ethylhydrogenpolysiloxane, phenylhydrogenpolysiloxane, and cyclohexylhydrogenpolysiloxane.

The polymerization degree of the polymeric Si compound is not critical, but it is preferably in the range from 10 cSt (centistokes) to about 100 cSt in consideration of the handling of the compound. The terminal structures of the hydropolysiloxane does not have a great influence, but it is preferably blocked with an inert group such as trialkylsilyl group.

2) Preparation

The component (A-1) can be prepared by the contact of the aforedefined components (A-1-i), (A-1-ii), and (A-1-iii).

(1) Amount ratio

The amount used of each component, which may be arbitrary as long as the effectiveness of the present invention is recognized, is preferably within the following range.

The amount used of the titanium tetraalkoxide and/or the polytitanic acid ester (component (A-1-ii)) (the total amount when used in combination thereof) is in a mole proportion of 0.1 to 10, preferably in a proportion of 1 to 4 to the amount of the magnesium dihalide (component (A-1-i)).

The amount used of the polymeric silicon compound (component (A-1-iii)) is in a mole proportion of $1 \times 10^{-2}$ to 100, preferably in a proportion of 0.1 to 10 to the amount of the magnesium dihalide (component (A-1-i)).

(2) Contact method

The solid component (A-1) of the present invention is obtained by contacting the aforedescribed three components. The contacting of the three components can be carried out by any of well-known methods. These components are generally contacted at a temperature of from $-100°$ C. to 200° C. The contact period is generally from 10 minutes to about 20 hours.

The aforedescribed three components are preferably contacted under stirring and can also be contacted by grinding with a machine such as a ball mill or a vibration mill. The sequence of the contacting of the three components may be arbitrary as long as the effectiveness of the present invention is recognized, but generally and preferably the magnesium dihalide and the titanium tetraalkoxide are contacted and the polymeric silicon compound is then contacted therewith.

The three components can also be contacted in the presence of a dispersing medium such as a hydrocarbon, halogenated hydrocarbon, and dialkylpolysiloxane. Specific examples of the hydrocarbon are hexane, heptane, toluene, and cyclohexane. Specific examples of the halogenated hydrocarbon are n-butyl chloride, 1,2-dichloroethylene, carbon tetrachloride, and chlorobenzene. Specific examples of the dialkylpolysiloxane are dimethylpolysiloxane and methylphenylpolysiloxane. A hydrocarbon is a preferable dispersing medium, an aliphatic hydrocarbon of 5 to 9 carbon atoms being more preferable. Hexane and heptane are more preferable examples for the dispersing medium.

In this connection, an alcohol or an organic acid ester can also be made to coexist for the purpose of controlling the properties of the catalyst as disclosed in Japanese Patent Laid-Open Publication No. 80406/1984.

The solid component (A-1) is preferably subjected, before contacting with the components (A-2), (A-3) and (A-4), to washing for eliminating unnecessary components such as unreacted portions of the components (A-1-ii) and (A-1-iii) and/or soluble adducts of the components (A-1i) to (A-1-iii). The washing solvent to be used can be selected appropriately from the aforementioned dispersing media. A hydrocarbon is preferable for the washing, an aliphatic hydrocarbon of 5 to 10 carbon atoms being preferable. Thus, when the contacting of the components (A-1-i) to (A-1-iii) is conducted in a hydrocarbon dispersant, the washing operation can be omitted or diminished.

Component (A-2)

The component (A-2) is an organoaluminum compound. The organoaluminum compound preferably used in the present invention is a compound represented by the general formula $R^6{}_a AlX^1{}_{3-a}$, wherein $R^6$ represents a hydrocarbyl group having 1 to 12 carbon atoms, $X^1$ represents a halogen or an alkoxy group having 1 to 12 carbon atoms, and a denotes $0 < a \leq 3$. Specific examples of such a compound include $Al(CH_3)_3$, $Al(C_2H_5)_3$, $Al(iC_4H_9)_3$, $Al(C_6H_{13})_3$, $(C_2H_5)_2AlH$, $(iC_4H_9)_2AlH$, $(CH_3)_2AlCl$, $(C_2H_5)_2AlCl$, $(iC_4H_9)_2AlCl$, $(C_2H_5)_{3/2}ALCL_{3/2}$, $CH_3AlCl_2$, $C_2H_5AlCl_2$, $iC_4H_9AlCl_2$, $(C_2H_5)_2Al(OC_2H_5)$, $(C_2H_5)_2AlBr$, and $(C_2H_5)_2AiI$. Among these compounds, trialkylaluminum and an alkylaluminum halide, particularly $Al(C_2H_5)_3$, $(C_2H_5)_2AlCl$ and $C_2H_5AlCl_2$, are preferred.

Component (A-3)

The component (A-3) is a silicon halide. In the present invention, a compound represented by the general formula $R^7{}_m SiX^2{}_{4-m}$ wherein $R^7$ represents a hydrocarbyl group preferably having 1 to about 10 carbon atoms and more preferably 1 to 4 carbon atoms or phenyl or a hydrocarbyloxy group preferably having 1 to about 10 carbon atoms and more preferably 1 to 4 carbon atoms or phenyl, $X^2$ represents a halogen and m denotes an integer from 0 to 2, can be used. The compound is preferably a silicon trihalide compound where m is 1 in the formula and more preferably a silicon tetrahalide where m is 0 in the formula. Specific examples of the compound include $SiCl_4$, $CH_3SiCl_3$, $(C_2H_5)SiCl_3$, $(C_4H_9)SiCl_3$, Ph-Si-$C_3$ (Ph: phenyl), $(C_2H_5)_2SiCl_2$, $(C_2H_5O)SiCl_3$, $(C_2H_5O)_2SiCl_2$, $CH_3(C_2H_5O)SiCl_2$, and $C_2H_5(C_2H_5O)SiCl_2$. Among these compounds, $SiCl_4$, $CH_3SiCl_3$ and $(C_2H_5)SiCl_3$ are preferable.

Component (A-4)

The component (A-4) is an organoaluminum halide. The organoaluminum halide preferably used in the present invention is the compound represented by the general formula $R^8{}_{3-b}AlX^3{}_b$, wherein $R^8$ represents a hydrocarbyl group having 1 to 12, preferably 1 to 6, carbon atoms, $X^3$ represents a halogen, and b denotes $1.5 \leq b < 3$. Specific examples of such a compound include $(CH_3)_{3/2}$, $AlCl_{3/2}$, $CH_3AlCl_2$, $(C_2H_5)_{3/2}$, $AlCl_{3/2}$, $C_2H_5AlCl_2$, $(iC_4H_9)_{3/2}AlCl_{3/2}$, $iC_4H_9AlCl_2$, $(C_2H_5)_{3/2}AlBr_{3/2}$ and $C_2H_5AlBr_2$. Sesquichloro- or dichloro compounds are preferably used, $(C_2H_5)_{3/2}AlCl_{3/2}$ and $C_2H_5AlCl_2$ being preferable examples.

Synthesis of the component

The aforedescribed component (A) is synthesized by contacting the components (A-1), (A-2) and (A-3), in this sequence, washing the contact product formed and further contacting the component (A-4) therewith.

(1) Amount ratio

The amount used of each component, which may be arbitrary as long as the effectiveness of the present invention is recognized, is preferably within the following range.

The amount used of the component (A-2) is in a proportion of 0.001 to 1, preferably 0.01 to 0.1 by mole, to the amount of Ti in the component (A-1).

The amount used of the component (A-3) is in a proportion of 0.01 to 10, preferably 0.1 to 5 by mole, to the amount of Ti in the component (A-1).

The amount used of the component (A-4) is in a proportion of 1 to 10, preferably 2 to 5 by mole, to the amount of Ti in the solid component after the abovedescribed reaction.

(2) Contacting method

The contacting of the components (A-1), (A-2) and (A-3) is preferably carried out under stirring in the presence of a dispersing medium. As the dispersing medium, those specified as the dispersing medium in the preparation of the component (A-1) can be used. The contacting of the components (A-1), (A-2) and (A-3) are generally carried out at a temperature of $-50°$ to 200° C., preferably 0° to 100° C., for 5 minutes to about 20 hours. Washing of the contact product is conveniently made by decanting the dispersing medium used and preferably at least once supplementing/decanting a fresh dispersing medium.

The contacting of the contact product thus formed and washed further with component (A-4) is carried out at a temperature of $-20°$ to 80° C. preferably 0° to 40° C., for 5 minutes to about 20 hours, preferably in a dispersing medium such as used in the contacting of the components (A-1) to (A-3).

Component (B)

The component (B) is an organoaluminum compound. In the present invention, a trialkylaluminum having 1 to about 12 carbon atoms in the alkyl is preferably used. Specifically, $Al(CH_3)_3$, $Al(C_2H_5)_3$, Al- (iC$_4$H$_9$)$_3$, Al(C$_6$H$_{13}$)$_3$, and isoprenylaluminum can be mentioned. An organoaluminum compound represented by the formula R$^9_c$AlX$^4_{3-c}$ wherein R$^9$ represents a hydrocarbyl group having 1 to 12 carbon atoms, X$^4$ represents hydrogen, a halogen atom or a hydrocarbyloxy group preferably having 1 to about 12 carbon atoms, and c denotes 1 or 2, can also be used alone or in combination. Specific examples of the organoaluminum compound are (CH$_3$)$_2$AlCl, (C$_2$H$_5$)$_2$AlCl, (iC$_4$H$_9$)$_2$AlCl, (C$_2$H$_5$)$_2$AlH, (iC$_4$H$_9$)$_2$AlH, (C$_2$H$_5$)$_2$Al(OC$_2$H$_5$), (iC$_4$H$_9$)$_2$Ai(OC$_2$H$_5$), (C$_2$H$_5$)$_2$Al(OiC$_4$H$_9$), (C$_2$H$_5$)$_3$/$_2$AlCl$_3$/$_2$, C$_2$H$_5$AlCl$_2$, iC$_4$H$_9$Al(OC$_2$H$_5$)$_2$, iC$_4$H$_9$Al(OC$_4$H$_9$)$_2$, (C$_2$H$_5$)$_2$AlBr, and (C$_2$H$_5$)$_2$AlI.

An alumoxane prepared by the reaction of a trialkylaluminum compound (singly or in admixture) and H$_2$O can also be used. Preferable examples of the component (B) include Al(C$_2$H$_5$)$_3$, Al(iC$_4$H$_9$)$_3$ and (C$_2$H$_5$)$_2$AlCl. More preferable examples of the component (B) are trialkylaluminums.

Polymerization of ethylene

The polymerization of ethylene or the copolymerization of ethylene with an α-olefin having 3 to 10 carbon atoms in an amount up to 10 mol % of the olefin mixture is conducted by slurry polymerization, gas phase polymerization or solution polymerization and applied to continuous polymerization, batch-wise polymerization or a process wherein preliminary polymerization is conducted. As the solvent or dispersant in the case of slurry polymerization, a hydrocarbon such as butane, pentane, hexane, heptane, cyclohexane, benzene, or toluene is used. The polymerization is conducted at a temperature from room temperature to 200° C., preferably from 50° to 150° C. The regulation of the molecular weight is generally conducted, as is well-known, with hydrogen.

The ethylene polymer thus obtained has a molecular weight distribution of a middle width. That is, the ratio FR of the melt index measured by ASTM D-1238-73 at a load of 10 kg and 2.16 kg of the ethylene polymer according to the present invention is 9 or more, particularly 9.5 or more (up to about 12) in the case of homopolymerization.

EXAMPLE 1

(1) Synthesis of the component (A-1)

Into a flask having a diameter of 10 cm which had been thoroughly purged with nitrogen was introduced 100 ml of dehydrated and deoxygenated n-heptane, followed by 0.1 mole of Mgcl$_2$ and 0.2 mole of Ti(O-n-C$_4$H$_9$)$_4$, and the mixture was reacted at 95° C. for 1 hour. The stirring blade used had a diameter of 6 cm. After the reaction was completed, the reaction mixture was cooled to a temperature of 40° C. Then 15 ml of methylhydrogenpolysiloxane was introduced, and reaction at a stirring speed of 20 rpm was carried out for 3 hours.

After the reaction was completed, the solid component obtained was washed with n-heptane. A portion of the solid component was taken out, and the average particle diameter was measured by the sedimentation method the solid component had an average particle diameter of 24.5 μm and supported Ti in an amount of 14.7% by weight.

(2) Reaction of the component (A-1) with the components (A-2) and (A-3)

Into a 500 cc flask which had been thoroughly purged with N$_2$ was added 25 g of the aforementioned component (A-1), and heptane was added to a total volume of 330 cc. After 0.58 g of ethylaluminum dichloride in a 15% by weight solution in heptane, molar ratio to Ti being 0.06, was added, 15.9 cc of SiCl$_4$, molar ratio to Ti being 1.8, was added dropwise over 20 minutes, and the mixture was reacted for 3 hours. The temperature was then raised to 90° C. for reaction for a further 3 hours. The reaction mixture was then thoroughly washed with heptane. The product was found to support Ti in 6.6% by weight.

(3) Reaction of the aforementioned product and the component (A-4)

The aforementioned solid component in an amount of 3 g was placed in a 500 cc flask, and heptane was added to a total volume of 130 cc. 1.05 g of ethylaluminum dichloride in a 15% by weight solution in heptane was added dropwise, and the mixture was reacted for 2 hours. The reaction mixture was then washed thoroughly with heptane. The product was found to support Ti in 4.7% by weight.

(4) Polymerization of ethylene

Into a stainless steel autoclave having an internal volume of 1.5 liters and equipped with a stirrer and a temperature control unit was introduced 800 ml of n-heptane, followed by 200 mg of triethylaluminum and 5 mg of the catalyst component synthesized as described above.

The mixture was heated to 90° C., and hydrogen at a partial pressure of 3 kg/cm$^2$ followed by ethylene at 6 kg/cm$^2$ were introduced to obtain a total pressure of 9 kg/cm$^2$.G. The polymerization was conducted for 2 hours. These conditions were kept constant during the polymerization. After the polymerization was completed, ethylene and hydrogen were purged, and the resulting substance in the form of a polymer slurry was taken out of the autoclave, filtered and dried overnight. A polymer in an amount of 137 g was obtained whereby a yield in a solid catalyst, PY, was 27,500 g-PE/g of solid catalyst. MI which a melt index at a load of 2.16 kg was 1.30, and FR which is a ratio of MI at a 10 kg load and MI at a 2.16-kg load and is used as a measure of molecular weight distribution, the larger the value, the wider the molecular weight distribution, was 9.40.

EXAMPLES 2 to 6

Comparative Examples 1 to 2

The component (A) was synthesized with the component (A-1) synthesized in a manner similar to that in Example 1 and with the compounds listed in Table 1 as the silicon halide and the organoaluminum compound of the components (A-2) and (A-4). Table 1 shows the results of the polymerization of ethylene in the same manner as in Example 1 except for the use of the respective component (A) obtained.

A solid catalyst obtained by the reaction of the components (A-1) and (A-3) without the contact treatment with the components (A-2) and (A-4) and a solid catalyst obtained by the reaction of the components (A-1) to (A-3) without the treatment with the component (A-4) are also shown in Table 1 as Comparative Example 1 and Comparative Example 2, respectively. As shown in Table 1, the ethylene polymers obtained with these catalysts in Comparative Examples have narrower molecular weight distributions as compared with those of the present invention.

EXAMPLE 7

Copolymerization of ethylene with 1-hexene

An apparatus for polymerization similar to that used in the polymerization of ethylene in Example 1 was used. Into this apparatus was introduced 800 ml of n-heptane followed by 270 mg of triethylaluminum, 3.5 cc of 1hexene and 40 mg of the solid catalyst used in Example 4.

Next, the temperature of the reaction system was raised to 80° C., and hydrogen at 0.1 kg/cm$^2$ and ethylene at 1.5 kg/cm$^2$ were introduced for polymerization for 2 hours while the total pressure was maintained at 1.6 kg/cm$^2$. As a result, a polymer was obtained in an amount of 180 g.

The yield P.Y. was 4,500 g-PE/g of solid catalyst; MI was 0.24; and FR was 11.5.

TABLE 1

| | Component (A-2) Organoaluminum compound | Al (A-2)/ Ti (A-1) Molar ratio | Component (A-4) Organoaluminum compound | Al (A-4)/ Ti (A-3)*3 Molar ratio | Ti (wt %) | Yield (g) | PY | MI | FR |
|---|---|---|---|---|---|---|---|---|---|
| Example 2 | EADC*1 | 0.05 | EADC | 2 | 3.8 | 120 | 24,000 | 0.99 | 9.5 |
| Example 3 | EADC | 0.07 | EADC | 2 | 6.0 | 75 | 15,000 | 0.98 | 9.9 |
| Example 4 | EADC | 0.06 | EADC | 3 | 4.8 | 90 | 18,000 | 0.77 | 9.9 |
| Example 5 | EADC | 0.06 | EADC | 5 | 5.2 | 38 | 7,600 | 0.61 | 10.3 |
| Example 6 | EADC | 0.06 | EASC*2 | 5 | 4.9 | 75 | 15,000 | 0.85 | 9.4 |
| Comparative Example 1 | — | — | — | — | 3.9 | 80 | 16,000 | 1.7 | 8.6 |
| Comparative Example 2 | EADC | 0.06 | — | — | 6.7 | 115 | 23,000 | 1.5 | 8.9 |

*1EADC: Ethylaluminum dichloride (EtAlCl$_2$),
*2EASC: Ethylaluminum sesquichloride (Et$_{3/2}$AlCl$_{3/2}$)
*3Ti in a solid obtained by contacting the components (A-1), (A-2) and (A-3) in this sequence and washing the contact product obtained.

Comparative Example 3

The procedure set forth in Example 1 for production of the component (A) was followed except for the washing of the reaction product of the components (A-1), (A-2) and (A-3) being not conducted. Polymerization of ethylene was conducted as in Example 1.

The result obtained is set forth in Table 2, wherein it is shown that the activity of catalyst was far lower than that in Example 1.

Comparative Example 4

The procedure set forth in Example 1 for production of the component (A) was followed except for the components (A-2) being not used and for the washing of the reaction product of the components (A-1) and (A-3) being not conducted. Polymerization of ethylene was conducted as in Example 1.

The result obtained is set forth in Table 2, wherein it is shown that the polymer produced had a smaller FR and narrower molecular weight distribution than those in Example 1.

TABLE 2

| | Ti (wt %) | Yield (g) | PY | MI | FR |
|---|---|---|---|---|---|
| Comparative Example 3 | 7.9 | 36 | 7,300 | 2.0 | 9.4 |
| Comparative Example 4 | 5.3 | 96 | 19,000 | 0.73 | 8.7 |

What is claimed is:

1. A process for producing an ethylene polymer comprising contacting an α-olefin which is ethylene or ethylene and an α-olefin having 3 to 10 carbon atoms with a catalyst thereby to polymerize the α-olefin, the catalyst consisting of the following components (A) and (B):
   component (A), a solid component for a Ziegler catalyst obtained by sequentially contacting the following components (A-1), (A-2) and (A-3) and then washing the contact product obtained with a hydrocarbon and then contacting the product thus washed with the following component (A-4):
   component (A-1), a solid catalyst component prepared by contacting the following components (A-1-i), (A-1-ii) and (A-1-iii):
   component (A-1-i), a magnesium dihalide;
   component (A-1-ii), a titanium tetraalkoxide and/or a polytitanic acid ester;
   component (A-1-iii), a polymeric silicon compound represented by the formula:

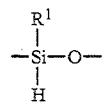

wherein R$^1$ represents a hydrocarbyl group;
   component (A-2), an organoaluminum compound;
   component (A-3), a silicon halide;
   component (A-4), an organoaluminum halide; and
   component (B), an organoaluminum compound.

2. The process as claimed in claim 1, wherein the α-olefin is selected from the group consisting of ethylene and a mixture of ethylene and the α-olefin in an amount of up to 10 mol % of the olefin mixture.

3. The process as claimed in claim 1, wherein the component (A-1-i) is MgCl$_2$.

4. The process as claimed in claim 1, wherein the component (A-1-ii) is a titanium tetraalkoxide of 1 to 6 carbon atoms in the alkyl.

5. The process as claimed in claim 4, wherein the component (A-1-ii) is titanium tetrabutoxide.

6. The process as claimed in claim 1, wherein the component (A-1-ii) is the polytitanic acid ester of a formula:

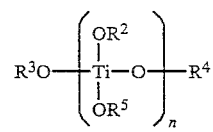

wherein R$^2$ to R$^5$, respectively, independently represent a hydrocarbyl group having 1 to 20 carbon atoms and n denotes a number of 2 to 10.

7. The process as claimed in claim 6, wherein the polytitanic acid ester has R$^2$ to R$^5$ which are each of 1 to 6 carbon atoms and are each saturated.

8. The process as claimed in claim 1, wherein the component (A-1-iii) is the polymeric silicon compound of the formula wherein $R^1$ is a hydrocarbyl group of 1 to 10 carbon atoms and the degree of polymerization is such that its viscosity is 10 to 100 centistokes.

9. The process as claimed in claim 1, wherein the molar ratio of component (A-1-ii) to component (A-1-i) is 0.1 to 10 and the molar ratio of component (A-1-iii) to component (A-1-i) is $1 \times 10^{-2}$ to 100.

10. The process as claimed in claim 1, wherein the component (A-2) is an organoaluminum of a formula: $R^6_a AlX^1_{3-a}$ where $R^6$ is a hydrocarbyl of 1 to 12 carbon atoms, $X^1$ is a hydrogen atom, a halogen atom or an alkoxy group of 1 to 12 carbon atoms, and a is a number satisfying an equation of $0 < a \leq 3$.

11. The process as claimed in claim 1, wherein the component (A-3) is a silicon halide of a formula: $R^7_m SiX^2_{4-m}$ where $R^7$ is a hydrocarbyl group of 1 to 10 carbon atoms or a hydrocarbyloxy group of 1 to 10 carbon atoms, $X^2$ is a halogen atom, and m is an integer from 0 to 2.

12. The process as claimed in claim 11, wherein the silicon halide is a compound of the formula where m is 0 or 1 and the $R^7$ is of 1 to 4 carbon atoms.

13. The process as claimed in claim 1, wherein the component (A-4) is an organoaluminum halide of a formula: $R^8_{3-b} AlX^3_b$ where $R^8$ is a hydrocarbyl group of 1 to 12 carbon atoms, $X^3$ is a halogen atom and b is a number satisfying an equation: $1.5 \leq b < 3$.

14. The process as claimed in claim 13, wherein the organoaluminum compound is a sesquichloro- or a dichloro compound.

15. The process as claimed in claim 1, wherein the molar ratio of the component (A-2) to the Ti in component (A-1) is 0.001 to 1; the molar ratio of the component (A-3) to the Ti in the component (A-1) is 0.01 to 10; and the molar ratio of the component (A-4) to the Ti in the component (A-1) is 1 to 10.

16. The process as claimed in claim 1, wherein the contact product of the components (A-1), (A-2), (A-3) and (A-4) is washed with a hydrocarbon solvent.

17. The process as claimed in claim 16, wherein the hydrocarbon solvent is an aliphatic hydrocarbon of 5 to 10 carbon atoms.

18. The process as claimed in claim 1, wherein the component (B) is an organoaluminum compound selected from the group consists of a trialkylaluminum having 1 to 12 carbon atoms in the alkyl group and a compound of a formula: $R^9_c AlX^4_{3-c}$ where $R^9$ is a hydrocarbyl group of 1 to 12 carbon atoms, $X^4$ is hydrogen atom, a halogen atom, or a hydrocarbyloxy group of 1 to about 12 carbon atoms and c is 1 or 2.

* * * * *